United States Patent [19]

Abenaim

[11] 4,313,050
[45] Jan. 26, 1982

[54] MEANS FOR ANCHORING A VESSEL TO SUPPORT IN ORDER TO PREVENT SPILLING OF THE VESSEL CONTENT

[76] Inventor: Jacques Abenaim, 12 Jolliet, St-Bruno de Montarville, Quebec, Canada, J3V 4Z1

[21] Appl. No.: 122,456

[22] Filed: Feb. 19, 1980

[51] Int. Cl.³ .............................................. H05B 1/00
[52] U.S. Cl. ..................................... 219/432; 126/24; 219/433
[58] Field of Search ...................... 219/443, 432, 433; 126/24, 135

[56] References Cited

U.S. PATENT DOCUMENTS

| D. 259,996 | 5/1971 | Sheiman et al. | |
|---|---|---|---|
| 726,241 | 4/1903 | Ayer | 219/433 |
| 910,479 | 1/1909 | Andrews | 219/433 |
| 1,006,104 | 10/1911 | Kuhn et al. | 219/433 |
| 1,047,088 | 12/1912 | Kuhn | 219/433 |
| 1,053,280 | 2/1913 | Copeman | 219/443 |
| 1,121,575 | 12/1914 | Abtmeyer | 219/432 |
| 1,583,076 | 5/1926 | Litter | 126/24 |
| 2,693,523 | 11/1954 | McCormick | 219/443 |
| 2,872,560 | 2/1959 | Bowles | 219/433 |
| 3,372,688 | 3/1968 | Moore | 126/24 |
| 3,593,702 | 7/1971 | Zigomalas | 126/390 |
| 3,659,604 | 5/1972 | Melville | 219/433 |

FOREIGN PATENT DOCUMENTS

| 181900 | 1/1918 | Canada . | |
|---|---|---|---|
| 225272 | 8/1922 | Canada . | |
| 1230453 | 9/1960 | France | 219/465 |
| 11630 | of 1913 | United Kingdom | 126/24 |

Primary Examiner—B. A. Reynolds
Assistant Examiner—Bernard Roskoski

[57] ABSTRACT

In a kitchen stove, the trim ring is secured against rotation and against upward removal to the top of the stove. The trim ring and the cooking vessel have an inter-engageable bayonet system to removably clamp the cooking vessel over the electric heating element or over the burner of the stove. In this way, heat is not lost around the side of the cooking vessel and, also, children cannot spill the content of the vessel, which results in a safe cooking system. The same anchoring system is also used to removably secure a vessel to a support surface in order to prevent spilling of the contents of the vessel. For instance, in the kitchen and dining room of a ship where the support surface might tilt, and in a chemical laboratory to avoid accidental spilling of dangerous substances.

3 Claims, 13 Drawing Figures

MEANS FOR ANCHORING A VESSEL TO SUPPORT IN ORDER TO PREVENT SPILLING OF THE VESSEL CONTENT

FIELD OF THE INVENTION

The present invention relates to means for removably fixing or anchoring in a relatively safe and simple way a container or a utensil or a vessel to a relatively secure surface, such as, for instance, a kitchen stove.

BACKGROUND OF THE INVENTION

The present practice for cooking on a kitchen stove or on a portable heating appliance is to simply deposit the cooking vessel either directly on the electric heating element or on a support extending over the fuel burning heating element at the top surface of the heating appliance. Considerable heat is lost around the cooking vessel, because air heated by the heating element can escape freely around the vessel from underneath the top wall of the applicance, especially when the diameter of the cooking vessel is smaller than the diameter of the heating element. Also, it is easy to accidentally spill the contents of the cooking vessel, and this results in burning accidents. Spilling accidents frequently occur in chemical laboratories when stirring dangerous substances in a container, in the kitchen or dining room of a ship where the support surface of a food container might tilt.

OBJECTS OF THE INVENTION

It is the main object of the invention to provide simple means to removably anchor a vessel to a support in order to prevent spilling of the vessel content.

It is another object of the invention to effect safer cooking on a kitchen stove or portable heating appliance.

It is yet another object of the present invention to considerably reduce the heat loss during cooking on a heating element.

SUMMARY OF THE INVENTION

The anchoring means, in accordance with the invention, comprises connector elements carried by a vessel or container which removably interlock with coacting connector elements carried by a support upon a limited rotation of said vessel relative to said support.

In a specific application, the vessel is a cooking vessel, the support is a cooking appliance having a heating means and a top wall surrounding said heating means, and the anchoring means serves to secure said cooking vessel to said wall with the vessel extending over said heating means. When the applicance is a stove and the top wall of said stove has an opening in which the heating means is located and exposed, and has an open work support member fitted in said opening, the invention further includes means to removably secure the support member to the top wall of the stove.

BRIEF DESCRIPTION OF THE DRAWINGS

The foregoing will become clearer by referring to the following description and to the annexed drawings, in which.

DETAILED DESCRIPTION OF THE INVENTION

Figure 1:
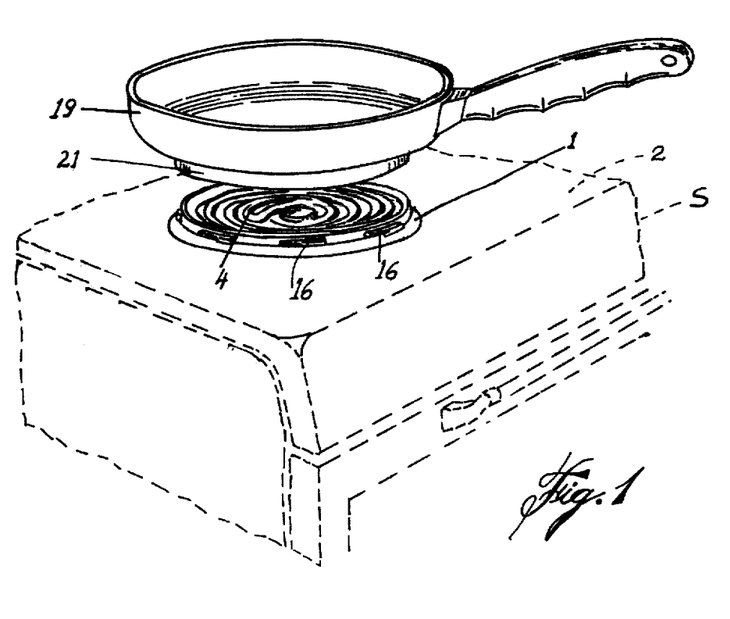
FIG. 1 is a perspective view of an electric heating element on top of a kitchen stove, shown in dotted lines and of a cooking vessel, such as a frying pan about to be secured over the heating element.
Figure 2:
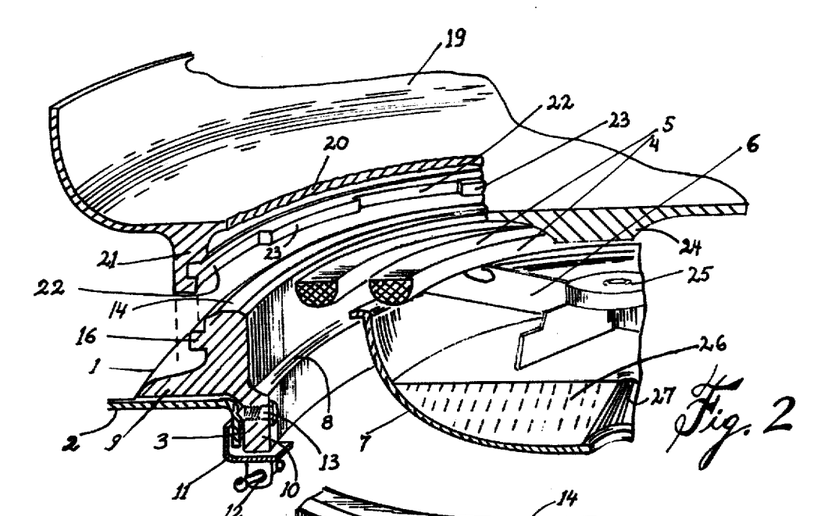
FIG. 2 is a partial perspective view and partial cross-section of the parts shown in full lines in FIG. 1.
Figure 2A:
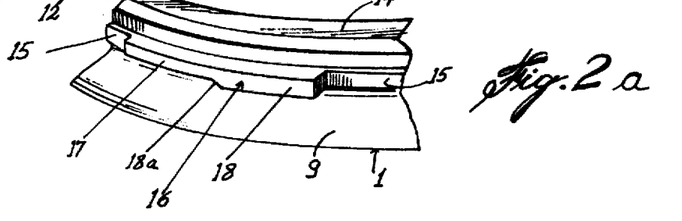
FIG. 2a is a partial perspective view of the trim ring.

Referring now more particularly to the drawings in which like reference characters indicate like elements throughout, there is shown a first embodiment of the invention in FIGS. 1 and 2.

A trim ring 1 is removably secured against upward removal and against rotation to the top wall 2 of a kitchen stove, generally indicated at S in FIG. 1. As is conventional, the top wall 2 is provided with a downwardly-depending flange 3, of circular shape, defining a circular opening in the top wall, in which is exposed an electric heating element 4 formed in the shape of a rigid helically-arranged elongated member usually having a flat top surface 5. The electric element 4, as is usual, is supported on top of a spoked member 6, of conventional construction, itself supported on the edge of an underlying spill collecting cup 7. The cup 7 is in turn removably supported on a shoulder 8 formed at the inner surface of the trim ring 1.

The trim ring 1 has a base portion 9 resting on the top wall 2 and a downwardly-depending flange 10, which extends opposite and overlaps flange 3 of top wall 2. L-shaped clips 11 are removably secured to the underface of flange 10 by means of wing bolts 12 or the like and engage around the flange 3 to prevent upward removal of the trim ring. Furthermore, setscrews 13 are threaded through the flange 10 and abut flange 3 of the top wall 2 to prevent rotation of the trim ring with respect to the top wall 2. Setscrews 13, together with clips 11 and bolts 12, are equally angularly spaced around the trim ring. When assembled, the various elements are of such dimensions that the top surface 5 of the electric heating element 4 will be at least flush with the top face 14 of the trim ring and, preferably, slightly higher than said top face 14.

The trim ring 1 is provided at its external cylindrical surface 15 with equally-angularly spaced ribs 16 projecting radially outwardly from the trim ring. Each rib has a leading end portion 17 of smaller thickness than the trailing end portion 18 to define a step 18a at the junction of portions 17 and 18.

The cooking vessel to be used is indicated at 19 and has any suitable circular shape, as conventional cooking vessels such as a frying pan, but is characterized by forming its bottom wall 20 with an annular skirt 21 having an internal cylindrical surface 22, of substantially the same diameter as the external cylindrical surface 15 of the trim ring 1, so as to have a clearance therewith. Inner cylindrical surface 22 is provided with a series of equally-spaced ribs 23, which are adapted to be inserted between the ribs 16 of trim ring 1 to a level below said ribs 16 upon lowering of the cooking vessel 19 over the heating element, and then to engage underneath the leading portion 17 of the ribs 16 until they abut step 18a formed by trailing portion 18 upon anti-clockwise rotation of the vessel 19, as shown in the drawings.

To facilitate centering of the frying pan with respect to the heating element and trim ring, the bottom wall 20 of the vessel 19 is provided with a central, downwardly depending boss 24 adapted to be inserted within the recess defined by the innermost circumvolution of the electric heating coil 4 opposite the conventional, central disc 25 supported by the spoked member 6. The cup 7 is preferably partially filled with a shaped block 26 of refractory and heat-insulating material to prevent escape of the heat from element 4. Shaped block 26 has a central hole 27 in register with the central opening 7' of that one of the cups 7 adapted to be mounted in register with the top flue opening of an underlying oven of the stove (not shown).

It is very simple to use the system of the invention; the cooking vessel 19 is selected so that its skirt 21 will have the diameter of the trim ring, supposing various heating elements are of different diameters on the stove. The cooking vessel is lowered while being orientated such as its ribs 23 will be interdigitated with the ribs 16 of the trim ring 1. Once the cooking vessel bears on the top face 14 of the trim ring, it is simply rotated anti-clockwise to cause inter-engagement of the two sets of ribs 23 and 16. Once in position, there is no way for the heat generated by electric element 4 to escape along the side of the vessel, and furthermore, the bottom wall 20 of the cooking vessel is in good heat conducting contact with the electric heating element 4. Therefore, the heating efficiency is maximized so much so that the heating-insulating shaped block 26 prevents escape of the heat to the remaining parts of the stove. A child cannot unlock the cooking vessel and the same can be orientated such that its handle will be in out-of-the-way position. The contents of the vessel, if spilling over due to excessive heat, will simply flow onto the top wall 2 of the stove. Therefore, removal of the trim ring and cleaning of the cup 7, and of the underlying partition of the stove, will not have to be effected as frequently as with the conventional system. Furthermore, fires are prevented because combustible material such as grease cannot contact the heating element.

Figures 7, 7A:
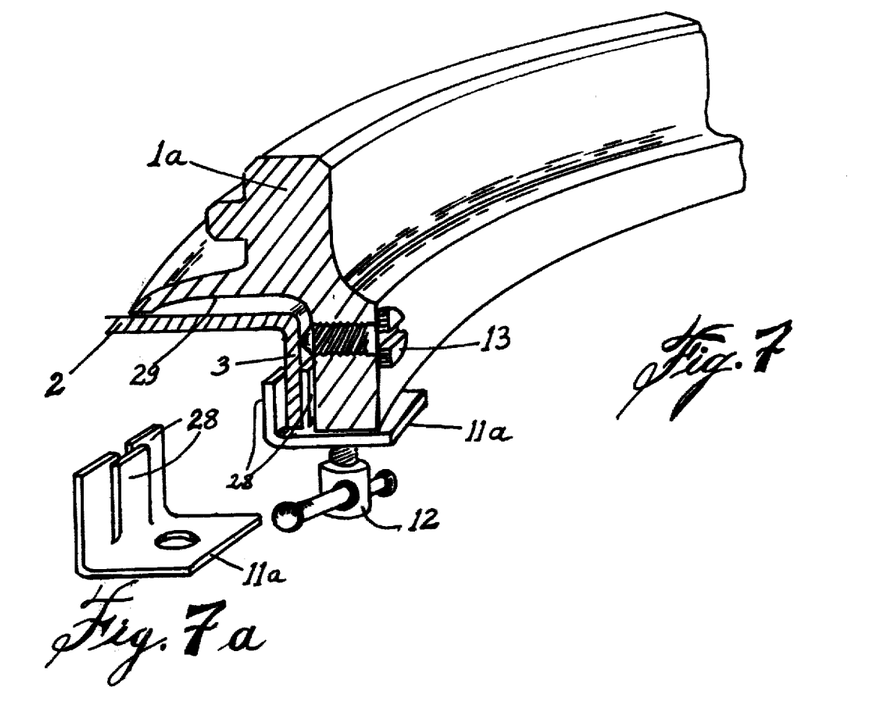
FIG. 7 is a perspective view, partly in cross-section, of another way of anchoring the trim ring to the top wall of the kitchen stove.
FIG. 7a is a perspective view of the modified clip used in FIG. 7.

FIG. 7 shows a system similar to that of FIG. 2, except that the L-shaped clip 11a forms split tongues 28 (more clearly seen in FIG. 7a), adapted to engage on both sides of the flange 3 of the top wall 2, so as to be retained thereon when the wing bolt 12 is unscrewed and the trim ring 1 is removed.

Also, the trim ring has a recessed underface 29.

Figure 8:
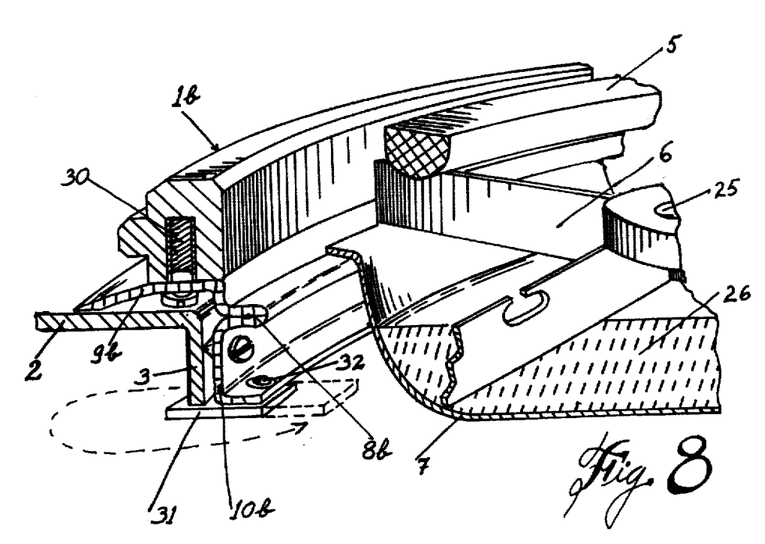
FIG. 8 is still another embodiment of the trim ring and of the means for securing the same to the top wall of the kitchen stove.

FIG. 8 shows a trim ring 1b, which is made of two parts removably secured together by a plurality of equally, angularly-spaced screws 30. This permits to make the base part 9b, together with the shoulder 8b, and the flange 10b out of sheet metal. Also, the retaining clip 11 or 11a is replaced by another means to prevent upward removal of the trim ring, namely: a tab 31 is pivoted at 32 underneath a lip 10c of flange 10b for removably engaging the under edge of the flange 3 of the top wall 2 of the stove.

Figure 6:
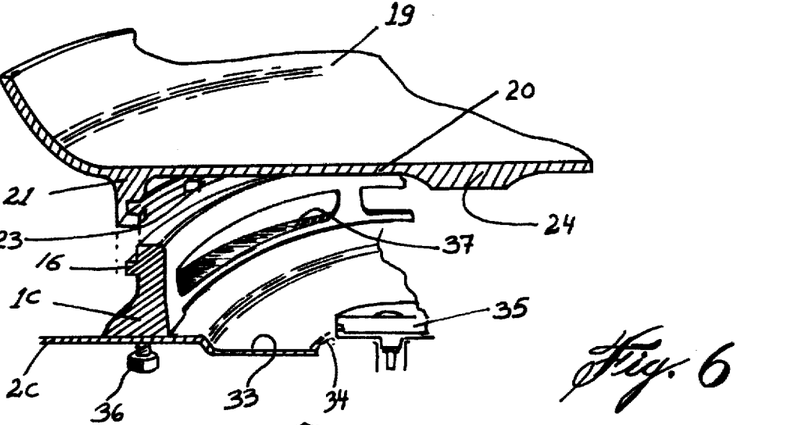
FIG. 6 is a perspective view, similar to that of FIG. 2, in which the heating means is a fuel burner.
Figure 6A:
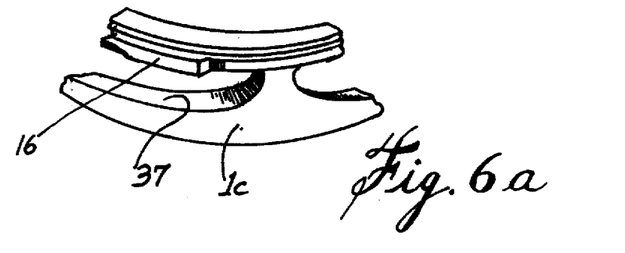
FIG. 6a is a partial perspective view of the trim ring used in FIG. 6.

FIGS. 6 and 6a show a system adapted to be used in conjunction with a fuel burning heating element. The top wall 2c is recessed at 33 to form a circular depression and has an opening 34 at the center of the recess for the location of a fuel burning element 35. The trim ring 1c is secured to the top wall 2c of the stove by means of screws 36. The trim ring 1c is provided with a series of equally, angularly-spaced openings 37 for the escape of the combustion gases. These openings 37 are just underneath the locking ribs 16, which are as described in relation with FIG. 2. The cooking vessel 19 is the same as in FIG. 2 and locks with the ribs 16.

Figure 3:
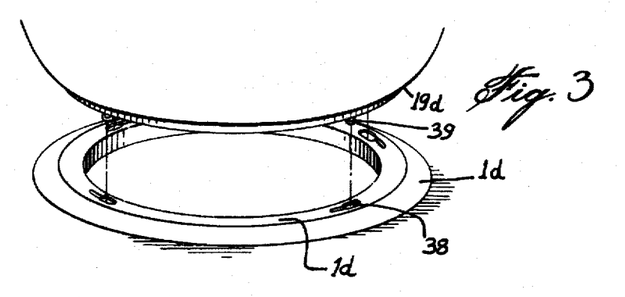
FIGS. 3, 4 and 5 are perspective views of the trim ring and of the bottom part of the cooking vessel showing three different means for removably anchoring the cooking vessel to the trim ring, FIG. 5 showing also the cooking vessel in partial cross-section.
Figure 4:
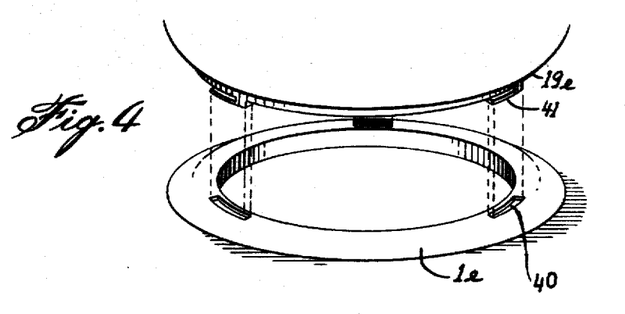
Figure 5:
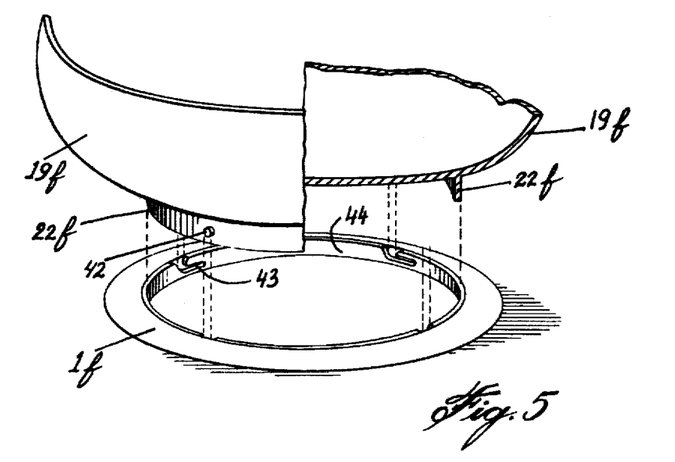

FIGS. 3, 4 and 5 show three additional embodiments of the means to removably lock the cooking vessel to the trim ring. In FIG. 3, bayonet slots 38 are made in the top wall 14d of the sheet metal trim ring 1d and are adapted to receive the heads of bolts 39 secured to the underface of the bottom wall of the cooking vessel 19d.

In FIG. 4, the trim ring 1e, also made of sheet metal, is provided at its top surface with angularly-spaced rectangular locking openings 40 adapted to receive locking tongues 41 depending from and parallel to the bottom wall of the cooking vessel 19e.

In both embodiments of FIGS. 3 and 4, there is no need for a skirt surrounding the bottom of the cooking vessel.

In the embodiment of FIG. 5, the cooking vessel 19f has a depending skirt 22f and a plurality of equally angularly-spaced studs 42 which radially protrude from the outer face of the skirt and are adapted to removably engage bayonet slots 43 made at the inner cylindrical wall 44 of the sheet metal trim ring 1f. Skirt 22f fits within wall 44.

The trim rings of FIGS. 3, 4 and 5 are removably secured to the top wall of the stove by either one of the systems shown in FIGS. 2, 6, 7 or 8.

Figure 10:
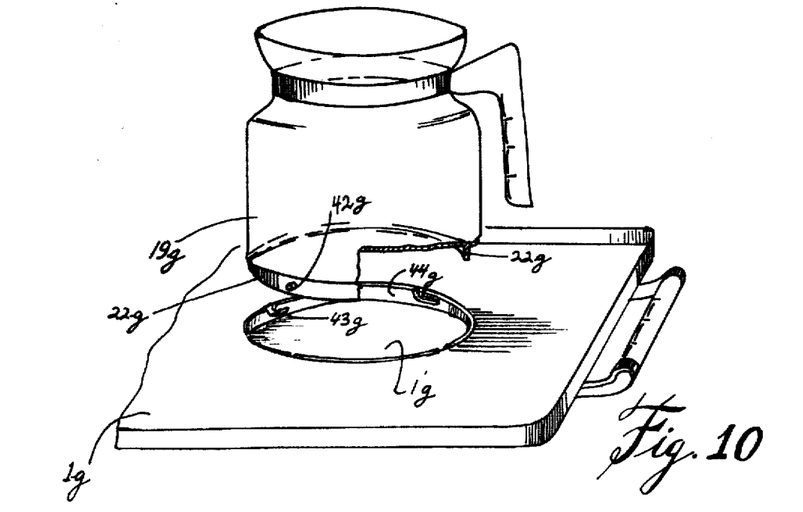
FIG. 10 is a similar exploded perspective view showing how a vessel such as a coffee pot can be removably anchored to a portable tray, shown in part.

In FIG. 10, a portable tray 1g has a circular recess in which is fitted and secured a cylindrical ring 44g having bayonet slots 43g for interlocking with studs 42g of a skirt 22g which depends from the bottom of vessel 19g, such as a coffee pot. Skirt 22g fits within ring 44g. The bottom 1'g of the recess can be electrically heated so that the tray can be a warmer tray.

Figure 9:
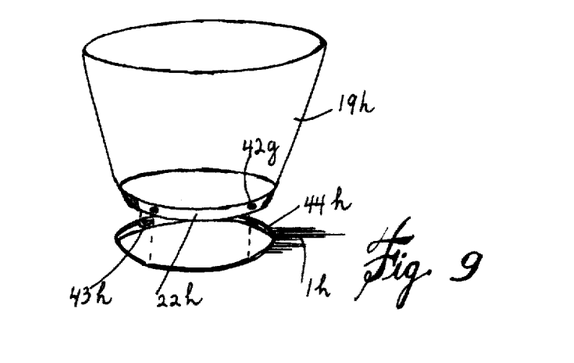
FIG. 9 is an exploded perspective view of a laboratory vessel and support table showing the vessel and table with interlocking anchoring means.

FIG. 9 illustrates how the anchoring means 44h, 43h, 42b and 22h, which correspond to anchoring means 44g, 43g, 42g and 22g respectively, are used to removably secure a vessel 19h, for instance a chemical laboratory flask, to a table or similar support 1h to prevent spilling of dangerous substances for instance during stirring of the flask content.

What I claim is:

1. The combination of a kitchen stove with a cooking vessel, said kitchen stove having a top wall provided with an opening, said top wall forming a downwardly depending annular flange delimiting said opening, a trim ring resting on said top wall and having a downwardly extending flange overlapping said annular flange of said top wall, means to removably secure said trim ring to said top wall against rotation and upward removal, said trim ring having a radially inwardly extending inner step, a spill-collecting cup having a peripheral rim removably resting on said step of said trim ring, said cup filling said opening, a spoked member removably resting on said rim, a heating means secured to said spoked member and located in said opening, said trim ring protruding upwardly from said top wall and having a top face and a radially outer cylindrical surface exposed above said top wall, said cooking vessel having a bottom wall, an annular skirt downwardly depending from said bottom wall and having an inner cylindrical surface removably overlapping said outer cylindrical surface of said trim ring and with said bottom wall of said cooking vessel resting on said top face of said trim ring, and inter-engageable connector means carried by the exposed radially outer cylindrical surface of said trim ring and by the inner cylindrical surface of the skirt of said cooking vessel to removably attach said cooking vessel to said trim ring upon limited rotation of said vessel relative to said trim ring.

2. The combination as claimed in claim 1, wherein said heating means is an electric heating element having a top surface substantially flush with the top face of said trim ring so as to contact the bottom wall of said cooking vessel.

3. The combination as claimed in claim 2, further including a heat insulating block carried by and partially filling said spill collecting cup.

* * * * *